United States Patent
Mahar et al.

(10) Patent No.: US 11,741,962 B1
(45) Date of Patent: *Aug. 29, 2023

(54) GENERATING CONTENT RECOMMENDATION BASED ON USER-DEVICE DIALOGUE

(71) Applicant: Amazon Technologies, Inc., Seattle, WA (US)

(72) Inventors: Matthew Dominick Mahar, San Francisco, CA (US); Rahul Agarwal, Seattle, WA (US); Emanuele Coviello, La Jolla, CA (US); Gustavo Souza Melo, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/862,201

(22) Filed: Jul. 11, 2022

Related U.S. Application Data

(63) Continuation of application No. 17/033,226, filed on Sep. 25, 2020, now Pat. No. 11,410,653.

(51) Int. Cl.
  *G10L 15/22* (2006.01)
  *G10L 15/06* (2013.01)
  *G10L 15/183* (2013.01)
  (Continued)

(52) U.S. Cl.
  CPC .............. *G10L 15/22* (2013.01); *G06F 3/165* (2013.01); *G06F 16/635* (2019.01);
  (Continued)

(58) Field of Classification Search
  CPC ... G10L 15/22; G10L 15/063; G10L 15/1815; G10L 15/183; G10L 2015/223;
  (Continued)

(56) References Cited

U.S. PATENT DOCUMENTS 11,031,001 B1* 6/2021 Cheng ............... G06F 40/35
11,482,223 B2* 10/2022 Dua ................. G06F 40/20
(Continued)

FOREIGN PATENT DOCUMENTS

CA 3080464 11/2020
CA 3080464 A1 * 11/2020 ......... G06F 16/9024
(Continued)

OTHER PUBLICATIONS

U.S. Appl. No. 17/033,226, "Corrected Notice of Allowability" dated May 12, 2022, 2 pages.
(Continued)

*Primary Examiner* — Mohammad K Islam
(74) *Attorney, Agent, or Firm* — Kilpatrick Townsend & Stockton LLP

(57) ABSTRACT

Techniques for generating a recommendation for content based on user-device dialogue are described. In an example, a computer system receives a request for audio output at a user device. The computer system determines a response for the request. The computer system determines a topic and value associated with the request and the response. The computer system also determines a recommendation for content based on the request and the response. The computer system generates prompt data including a question of whether to initiate an action associated with the recommendation. The computer system sends the prompt data and the response data to the user device or a different user device.

20 Claims, 10 Drawing Sheets

(51) Int. Cl.
  *G06F 16/635* (2019.01)
  *G06F 16/638* (2019.01)
  *G06N 20/00* (2019.01)
  *G10L 15/18* (2013.01)
  *G06F 3/16* (2006.01)

(52) U.S. Cl.
  CPC ........... *G06F 16/638* (2019.01); *G06N 20/00* (2019.01); *G10L 15/063* (2013.01); *G10L 15/183* (2013.01); *G10L 15/1815* (2013.01); *G10L 2015/223* (2013.01)

(58) Field of Classification Search
  CPC ...... G06F 16/638; G06F 16/635; G06F 3/165; G06N 20/00
  See application file for complete search history.

(56) References Cited

U.S. PATENT DOCUMENTS

| | | | |
|---|---|---|---|
| 2019/0035397 A1* | 1/2019 | Reily | G06F 16/632 |
| 2021/0042136 A1* | 2/2021 | Zhu | G06V 10/764 |
| 2021/0192134 A1* | 6/2021 | Yue | G06F 3/04817 |
| 2021/0248136 A1* | 8/2021 | Panuganty | G06F 16/2453 |
| 2021/0280180 A1* | 9/2021 | Skobeltsyn | G10L 15/18 |
| 2021/0358499 A1* | 11/2021 | Lefkofsky | G16H 10/60 |
| 2021/0400235 A1* | 12/2021 | Kamisetty | H04L 65/1069 |
| 2022/0012076 A1* | 1/2022 | Natarajan | G06F 16/24575 |

FOREIGN PATENT DOCUMENTS

| | | | | |
|---|---|---|---|---|
| EP | 3528502 A1 * | 8/2019 | | G06F 16/73 |
| KR | 102150508 | 9/2020 | | |
| KR | 102150508 B1 * | 9/2020 | | G06F 3/0482 |
| WO | 2017112813 | 6/2017 | | |
| WO | WO-2017112813 A1 * | 6/2017 | | G06F 16/90332 |

OTHER PUBLICATIONS

U.S. Appl. No. 17/033,226, Notice of Allowance, dated Mar. 30, 2022, 10 pages.

* cited by examiner

US 11,741,962 B1

GENERATING CONTENT RECOMMENDATION BASED ON USER-DEVICE DIALOGUE

CROSS-REFERENCE TO RELATED APPLICATION

This application claims priority to and is a continuation of U.S. patent application Ser. No. 17/033,226, filed Sep. 25, 2020, and entitled "GENERATING CONTENT RECOMMENDATION BASED ON USER-DEVICE DIALOGUE," the content of which is hereby incorporated by reference in its entirety for all purposes.

BACKGROUND

As voice recognition technology improves, systems that employ such technology continue to proliferate. Some systems employ what is referred to as near-field voice recognition where a user speaks into a microphone located on a hand held device, such as a remote control or mobile device. Other systems employ far-field voice recognition where a user can speak to a device while the user is within the general vicinity of the device, e.g., within the same room, but not necessarily in close proximity to or even facing the device. Both far-field devices and near-field devices can be used for audio and video playback.

BRIEF DESCRIPTION OF THE DRAWINGS

Various embodiments in accordance with the present disclosure will be described with reference to the drawings, in which.

DETAILED DESCRIPTION

Figure 1:
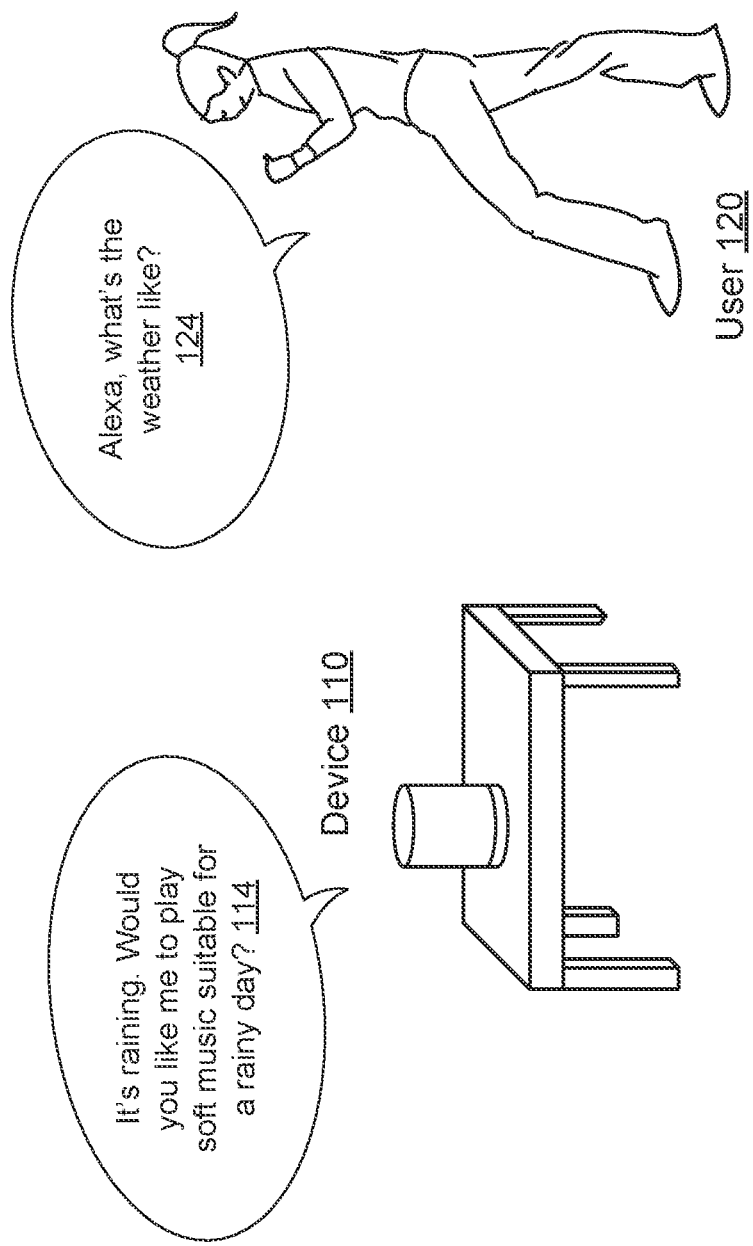
FIG. 1 illustrates an example of a device outputting a content recommendation, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, generating content recommendations based on a user-device dialogue. In an example, a computer system receives a request for output from a user device, such as a from a voice-controlled device. The request includes speech-to-text data generated based on speech input at the user device. The computer system determines response data for a response to the request based on, for instance, the speech-to-text data. A language mode of the computer system determines a topic associated with the request and a value associated with the response. Further, a machine learning (ML) model or a recommendation engine of the computer system determines candidate recommendations for actions to be taken at the user device, where such actions may be relevant to the user-device dialogue and may augment the scope of the response. Depending on the speech-to-text data, the response, and a user account associated with the user device, the ML model determines a recommendation from the candidate recommendations and generates a question of whether to initiate the recommendation at the user device. In addition to sending the response data, the computer system generates and sends, to the user device, prompt data that includes the question and the recommendation and the user device outputs the response data prior to outputting the prompt data. In this way, a user receives the response to their request and a recommendation for an action that may be relevant to the request and the response.

To illustrate, consider an example of a smart speaker that responds to a specific wake word (e.g., "Alexa"). A user can provide a natural language utterance for a request for a response (e.g., "what's the weather like?") while in the vicinity of the smart speaker. A microphone of the smart speaker detects the speech input and a processor of the smart speaker detects the wake word therefrom. In response, the smart speaker outputs a weather report and a music recommendation suitable for the reported weather. To do so, the smart speaker sends a request to a computer system, such one implementing a cloud computing service. The request can include at least a portion of the detected audio (e.g., "what's the weather like"). The computer system generates and processes speech-to-text data from the detected audio and determines response data about the request (e.g., the weather report including a value of "rainy"). The computer system inputs, to a language model, the speech-to-text data along with the response data. The language model indicates that the request includes a topic of "weather" and the response indicates a value of "rainy". Using an ML model, the computer system determines candidate music recommendations based on the topic and value (e.g., different playlists associated with "rain" or "rainy conditions"). Based on the speech-to-text data, the response data, and a user preference, the computer system determines a music recommendation from the music recommendations (e.g., a particular playlist for a rainy day and for which the user affinity may be relatively high). Accordingly, the computer system generates prompt data indicating a question of whether to playback the music recommendation (e.g., "would you like me to play your favorite soft music suitable for a rainy day?"). Upon receiving the prompt data and the response data, the smart speaker outputs on its speakers a prompt of "It will be a rainy day with low temperature.

Would you like me to play your favorite soft music suitable for a rainy day?" and plays the music content if the user instructs the smart to play the recommended music.

Embodiments of the present disclosure provide various technological advantages over a conventional computer system that provides content. For example, the conventional computer system can generate and output responses to requests (e.g., a weather report in response to a request for such a report). However, a response does not include prompt data about a recommendation for an action that is not directly related to the request (e.g., music recommendations) and that may be relevant to the user-device dialogue. In comparison, the embodiments generate the prompt data such that the user-device dialogue is augmented and the action can be triggered upon receiving a follow-up user confirmation or instruction at the user device. Because the follow-up user confirmation can be sufficient to trigger the action, a user need not make multiple requests, each in a dialogue session. Accordingly, the amount of speech input received by the user device is reduced. As a result, the amount of processing at the user device and the computer system and the amount of data exchange and network use between the user device and the computer system are reduced.

FIG. 1 illustrates an example of a device 110 outputting a content recommendation, according to embodiments of the present disclosure. As illustrated, the device 110 may be located in a room and be operable by a user 120. Upon detection of speech input, the device 110 processes the speech input and outputs a prompt as a response. The prompt includes a question of whether the device 110 should initiate an action associated with a determined recommendation. The prompt is customized based on the speech input and response data determined for the speech input. As further illustrated in the next figures, the processing and customization can be performed, at least in part, in connection with a computer system, such as a backend server or a cloud computing service.

In an example, the device 110 represents a computing device that is capable of supporting various computing services including, for instance, audio processing operations. In particular, the device 110 includes one or more audio processing systems, one or more network interfaces, one or more microphones, one or more speakers, and/or other computing components. Audio can be detected by a microphone and can be processed by a computer system to determine content to be output by the device 110. In an illustration, the device 110 can be any of a smart speaker, a multimedia device, a smart home device, a tablet, a mobile device, an Internet of Things (IoT) device, or any other type of suitable computing device.

In the illustration of FIG. 1, the device 110 is a smart speaker responsive to a wake word (e.g., "Alexa") and can be controlled by the user 120 based on speech input 124 of the user 120. For instance, upon an utterance that includes the wake word and a command (e.g., "Alexa, what's the weather like?"), the device 110 detects the wake word and performs the command (e.g., determines and outputs a question for playing recommended music). The device 110 outputs a prompt 114 (e.g., shown as "It's raining. Would you like me to play soft music suitable for a rainy day?") responding to the speech input 124 and including a question for additional content unrelated to the speech input 124. The response (e.g., "It's raining") is output by the device 110 prior to the device 110 outputting the question (e.g., "Would you like me to play soft music suitable for a rainy day?").

To generate prompt data for the prompt 114, the device 110 sends a request to a computer system, such as one implementing a cloud computing service. The request can include at least a portion of the detected speech input 124 (e.g., "What's the weather like?"). The computer system determines a topic of the speech input 124 and value for the topic indicated by response data. For example, the computer system determines the topic is "weather" and the value is "rainy". The computer system uses the speech input 124 along with the topic, the value, the response data, and user data to determine a music recommendation. For example, the computer system indicates that "soft music" is recommended content. The computer system also determines a question of whether to output the music recommendation. The computer system includes the music recommendation and the question in prompt data that is sent along with the response data to the device 110. Upon receiving the prompt data and response data, the device 110 outputs on its speakers the prompt 114 of "It's raining. Would you like me to play soft music suitable for a rainy day?" and starts streaming the music playlist if the user 120 indicates the device 110 should play the music recommendation.

Prompt data generation for music content is one example use case. Embodiments of the present disclosure are not limited to this use case and similarly apply to other audio processing operations. For example, prompt data related to content output can be generated for other types of content such as recipes, podcasts, products, and movies (e.g., in response to "Alexa, please give me a recipe recommendation," the device 110 may output "here is a taco recipe. Would you like me to send a message to your family about your Taco Tuesday?" in response to determining that the recipe is for tacos).

Figure 2:
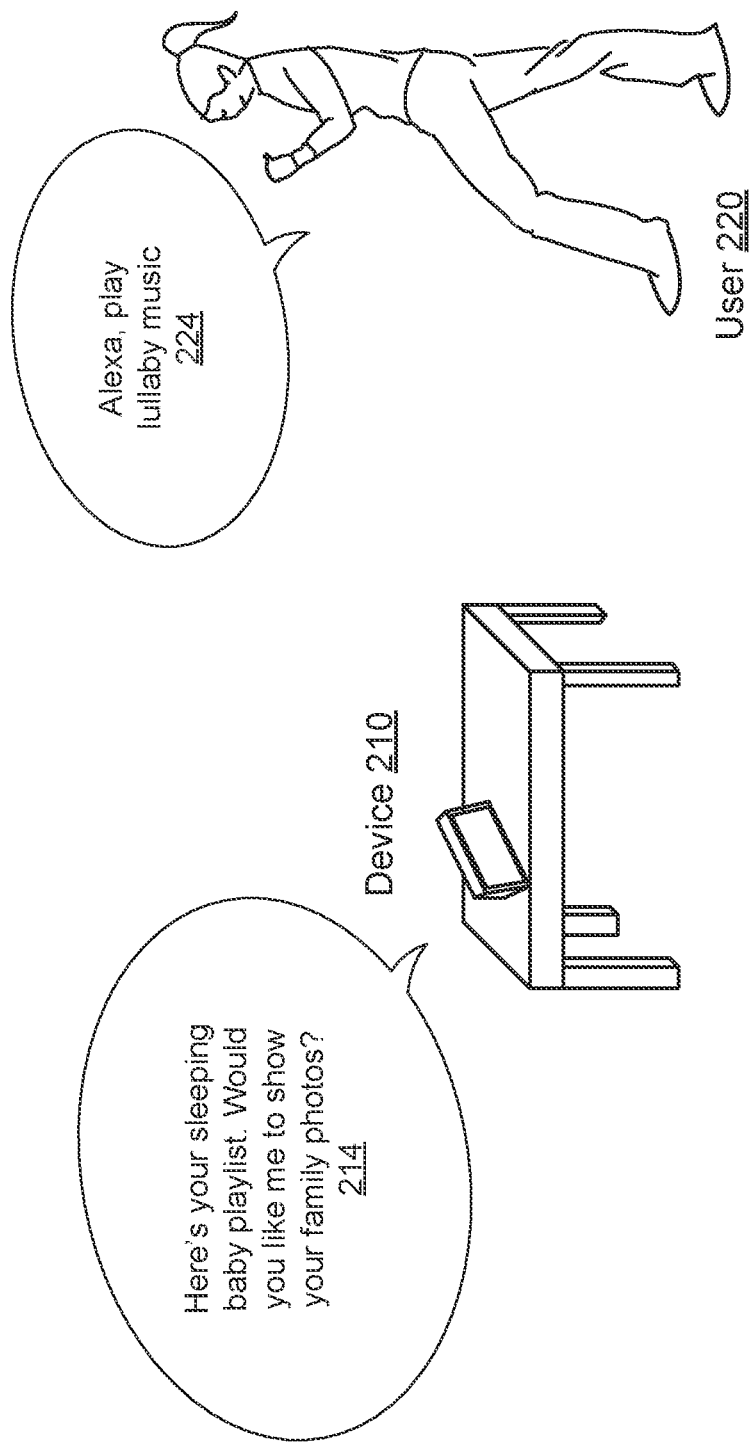
FIG. 2 illustrates another example of a device outputting a content recommendation according to embodiments of the present disclosure.

FIG. 2 illustrates another example of a device 210 outputting a content recommendation, according to embodiments of the present disclosure. The device 210 is an example of the device 110 of FIG. 1 that includes a graphical user interface (GUI) for visual output. A computer system associated with the device 210 can recognize speech input for a music-related request. The computer system can respond to the request and generate a recommendation for an additional action for the device 210 unrelated to music.

In an example, the device 210 receives a speech input 224 (e.g., shown as "Alexa, play lullaby music") from a user 220. The device 210, in communication with the computer system, processes the speech input 224 and outputs a prompt 214 (e.g., shown as "Here's your sleeping baby playlist. Would you like me to show your family photos?"). The computer system determines the speech input 224 includes a request for music playback. The computer system additionally determines a topic of the speech input 224 and a value associated with a response to the speech input 224. For example, the computer system determines the topic is "lullaby music" and the value is "sleeping baby playlist". Based on the speech input 224, the topic, the value, the response, and user data, the computer system determines a recommendation for an additional action for the device 210. For example, the computer system generates a recommendation for family photos to be displayed on the device 210. The computer system also generates a question of whether to initiate playing the recommendation at the device 210. The computer system includes the recommendation and the question in prompt data that is sent along with the response data to the device 210. Upon receiving the prompt data and response data, the device 210 outputs on its speakers the prompt 214 of "Here's your sleeping baby playlist. Would you like me to show your family photos?" and starts showing the photos if the user 220 indicates the device 210 should play the photos.

Figure 3:
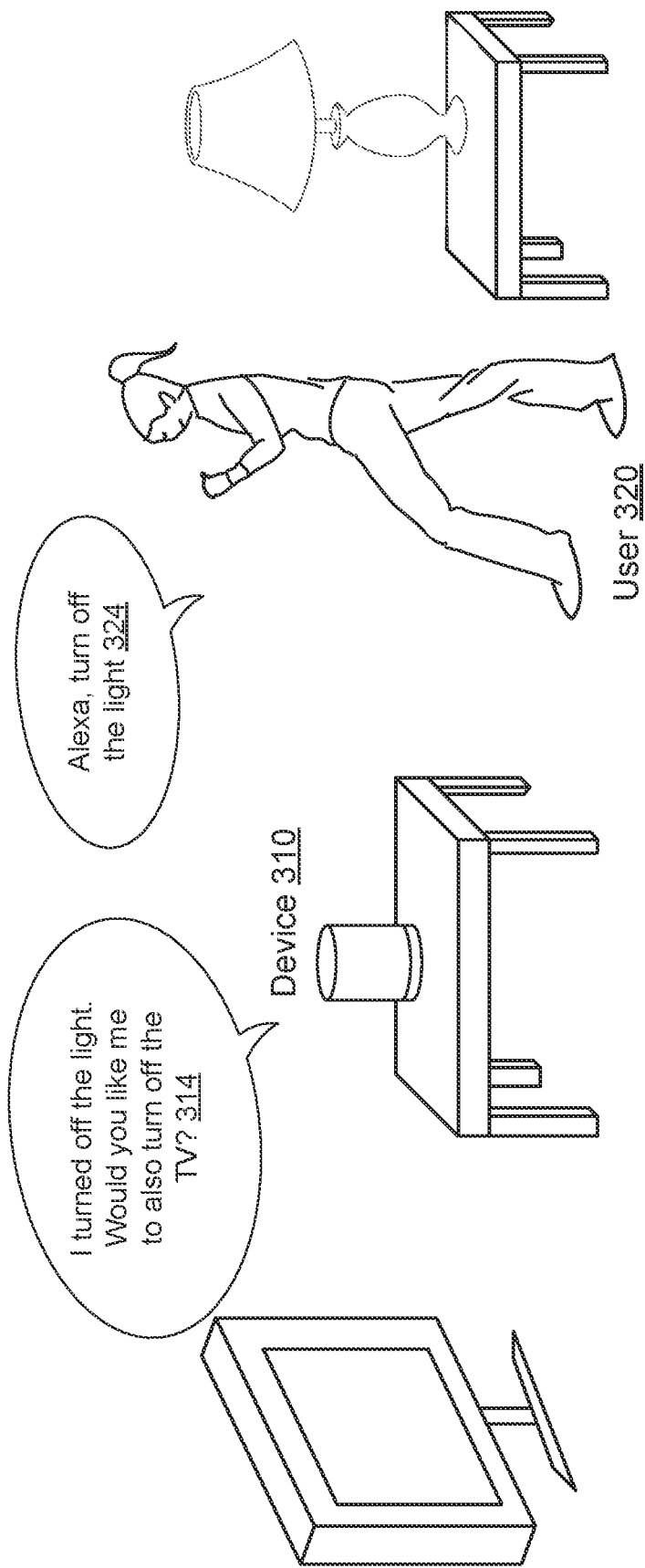
FIG. 3 illustrates another example of a device outputting a content recommendation according to embodiments of the present disclosure.

FIG. 3 illustrates another example of a device outputting a content recommendation according to embodiments of the present disclosure. The device 310 is an example of the device 110 of FIG. 1. A computer system associated with the device 310 can recognize speech input for a request for an output unrelated to music playback. The computer system can respond to the request and generate a recommendation for an additional action for the device 310 unrelated to music playback.

In an example, the device 310 receives a speech input 324 (e.g., shown as "Alexa, turn off the light") from a user 320. The device 310, in communication with the computer system, processes the speech input 324 and outputs a prompt 314 (e.g., shown as "I turned off the light. Would you like me to also turn off the TV?"). The computer system determines the speech input 324 includes a request unrelated to music playback. The computer system additionally determines a topic of the speech input 324 and a value associated with a response to the speech input 324. For example, the computer system determines the topic is "lights" and the value is "off". Based on the speech input 324, the topic, the value, the response, and user data, the computer system determines a recommendation for an additional action for the device 310. For example, the computer system generates a recommendation for the device 310 to turn off a television. The computer system also generates a question of whether to initiate turning off the television. The computer system includes the recommendation and the question in prompt data that is sent along with the response data to the device 310. Upon receiving the prompt data and response data, the device 310 outputs on its speakers the prompt 314 of "I turned off the light. Would you like me to also turn off the TV?" and turns the television off if the user 320 indicates the device 310 should turn off the television.

Figure 4:
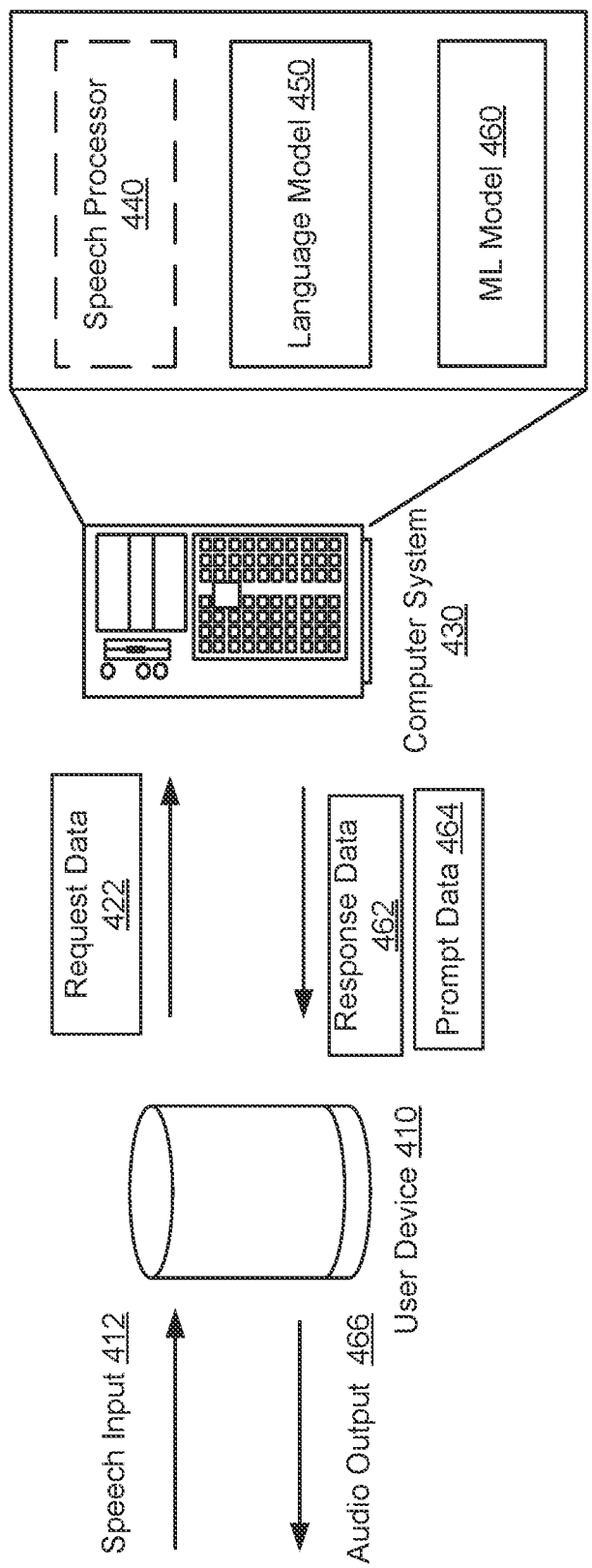
FIG. 4 illustrates an example of components of a system for generating a content recommendation based on user-device dialogue, according to embodiments of the present disclosure.

FIG. 4 illustrates an example of components of a system for generating a content recommendation based on user-device dialogue, according to embodiments of the present disclosure. The system includes a device 410, which is an example of device 110 in FIG. 1. The system also includes a computer system 430 that is capable of supporting various computing services including, for instance, action and content recommendation operations. In particular, the computer system 430 includes one or more processors, one or more memories storing computer-readable instructions, one or more network interfaces, and/or other computing components.

In an example, the device 410 receives speech input 412. A microphone of the device 410 receives the speech input 412. The speech input 412 is from a user and may include a wake word (e.g., "Alexa") associated with the device 410. The speech input 412 also includes a command (e.g., "what's the weather like?").

In an example, the device 410 transmits request data 422 to the computer system 430. The device 410 may support a number of audio-processing operations including, for instance, sound detection, automatic speech recognition (ASR), voice over internet protocol (VOIP) processing, playback, and the like. The device 410 can process the speech input 412 to generate speech-to-text data based on the speech input 412. The speech-to-text data can correspond to the request data 422. Alternatively, the request data 422 may be audio data including at least part of the speech input 412.

In an example, the computer system 430 receives the request data 422 at a speech processor 440. The speech processor 440 may alternatively be a component of the device 410. The speech processor 440 performs audio processing operations such as ASR and natural language understanding (NLU) to generate speech-to-text data, as needed (e.g., if audio data is received) and an understanding of this data (e.g., the intent such as the command of "playback operation," and the tokens or values such as "weather"). The computer system 430 generates response data 462 for a response to the request. The response data 462 includes audio output, the speech input 412, and the response data associated with a dialogue event processed by the computer system 430.

In an example, a language model 450 of the computer system 430 receives the speech-to-text data of the request data 422 and the response data 462. The language model 450 can be any suitable ML model. The language model 450 performs audio processing operations to determine a topic associated with the dialogue event. For example, the language model 450 determines the topic is "weather". The language model 450 additionally determines a value associated with the response. The language model 450 uses the response data 462 to determine the value. For example, the language model 450 determines the value is "rainy".

In some examples, the language model 450 also generates candidate recommendations based on the topic and the value. In this case, the language model 450 may use the same ML model to generate, a different ML model, or a set of hard-codes rules to generate the candidate recommendations. For instance, the hard-coded rules can be implemented as if-then rules, where topics and values can be associated with candidate recommendations using predefined mappings. Alternatively, a recommendation engine of the computer system 430 can generate the candidate recommendations. The recommendation engine receives the topic and value to determine the candidate recommendations. In another alternative example, the topic and value can be output to an ML model 460 of the computer system 430, where the ML model 460 is configured to generate the candidate recommendations and select a subset of them.

In an example, the ML model 460 of the computer system 430 receives the speech-to-text data, the response data, the topic, the value, and user data. Based on these inputs, the ML model 460 determines a recommendation for an action to be taken at the device 410. The recommendation can be determined from the candidate recommendations. For example, the ML model determines a recommendation for soft music to be played by the device 410 based on the topic of "weather" and the value of "rainy." The same ML model 460 or an additional ML model determines a question of whether to initiate an action associated with the recommendation at the device 410. For example, the ML model 460 determines a question of "Would you like me to play soft music suitable for a rainy day?" based on the recommendation being "soft music."

In an example, the computer system 430 generates prompt data 464. The prompt data 464 indicates the question of whether to initiate the action associated with the recommendation. The computer system 430 sends the prompt data 464 and the response data 462 to the device 410. The device 410 outputs the response data 462 prior to outputting the prompt data 464. As a result, a user would receive the response to the request before being presented with the recommendation.

In an example, the response data 462 and/or the prompt data 464 can be additionally or alternatively sent to one or more other user devices. For instance, multiple user devices may be registered with a group account. The group account can include multiple, individual accounts. Each of the user devices can be associated with the group account and, optionally, with one or more individual accounts. The response data 462 and/or the prompt data 464 can be sent to one or more of the user devices depending on the association with the accounts. To illustrate, the group account can be a family account that includes a parent account and a child account as the individual accounts. The device 410 is associated with the parent account. The request data 422 is received from the device 410 and relates to an action to be performed at a second user device associated with the child account (e.g., "Alexa, stop Internet browsing on my child's device"). The recommendation is to start an audio book. The response data 462 is sent to both devices (e.g., "the Internet browsing has been stopped") and the recommendation is sent to the second device (e.g., "would you like to listen to audio book XYZ."). In another illustration, one or more user devices may be associated with a guest account at least temporarily. In situations where a guest account association exists, the response data 462 and/or the prompt data 464 can be sent to one or more of the user devices. For instance, a first user device of a first user may be registered under a first user account that may include first user data specific to the first user, such as music playlists, subscriptions, user preferences, and the like. Similarly, a second user device of a second user may be registered under a second user account that may include second user data specific to the second user. At some point in time (e.g., a gathering of the two users), the first user device may be associated with the second user account via a guest account. In this way, some of the first user data can be also used to provide content to the second user device (e.g., to play music from the music playlists of the first user, to stream content given the first user's subscriptions, etc.). The first user may start music playback on their first user device given their first user account (or initiate an action). Based on the guest account association to the second user account, the music playback may be shared with and output at the second user device (or the action may be performed at the second user device). Because a guest account association exists, the response data 462 and/or the prompt data 464 can be sent to one or both user devices (e.g., the response data 462 can be set to the first user device at which the music playback request was made, whereas the prompt data 464 can be sent to the second user device at which the music output occurs).

In an example where the user confirms the recommended action should be initiated (e.g., music is to be played), the device 410 sends other request data to the computer system 430 indicating so. The speech processor 440 processes the other request data and the computer system 430 initiates the action. For example, the computer system 430 sends music content to the device 410 for the device 410 to output as a stream.

Figure 5:
FIG. 5 illustrates an example of a language model of a system generating a recommendation for content, according to embodiments of the present disclosure.

FIG. 5 illustrates an example of a language model 530 of a system generating a recommendation for content, according to embodiments of the present disclosure. The language model 530 is an example of the language model 450. The language model 530 may be part of a computer system, such as the computer system 430. The language model 530 can be implemented in hardware or as software code executing on hardware and is described herein next.

In an example, the language model 530 receives speech-to-text data 510 corresponding to speech input from a user at a device communicatively connected to the computer system. The language model 530 also receives response data 520 generated by the computer system. The response data 520 includes a response to the speech input. For example, of the speech input is "Alexa, what's the weather like?" the response data 520 includes the response "It's raining."

In an example, the language model 530 determines a topic 540 associated with the speech-to-text data 510 and the response data 520. The language model 530 is any suitable model for determining the topic 540. For example, the language model 530 may include hierarchies of words. The top of a hierarchy can correspond to the topic 540. For example, a hierarchy includes "sunny", "rainy", "cloudy", "hot", "cold", and "weather" at the top. The language model 530 can navigate the hierarchy upon determining the response data 520 includes "rainy" to locate the topic 540 of "weather."

In another example, the language model 530 can be a semantic machine-learning model. The language model 530 can process the speech-to-text data 510 to determine the topic 540 associated with the speech-to-text data 510. For example, the language model 530 processes the speech-to-text data 510 including speech input of "What's the weather like?" Based on training with historical inputs and associated topics, the language model 530 determines the topic 540 is weather. In another example, the language model 530 processes speech-to-text data of "Alexa, play Artist ABC" and determines the topic 540 is "music" based on training with historical data.

In an example, the language model 530 (e.g., hierarchy model or semantic machine-learning model) also determines a value 550 associated with the response. The language model 530 processes the response data 520 to determine the value 550. For example, the language model 530 determines the value 550 is "rainy" based on the response data 520 including a response of "It's raining."

In an example, the language model 530 determines candidate recommendations for additional actions to be taken at the device in addition to outputting the response. The language model 530 can include a lookup of mappings between topic-value pairs and recommendations. For example, the topic 540 of "weather" and the value 550 of "rainy" can map to "soft music" recommendations. The language model 530 may access a data store to determine candidate recommendations that fit the mapping. For instance, the language model 530 can select all playlists with the word "rainy", with synonyms of "rainy", or other music entities (e.g., playlists, albums, artists, songs) that are similar to music in these playlists. In another example, rather than using hard coded mappings, the language model 530 may include a machine learning model that is trained to output candidate recommendations based on topic-value pairs.

Figure 6:
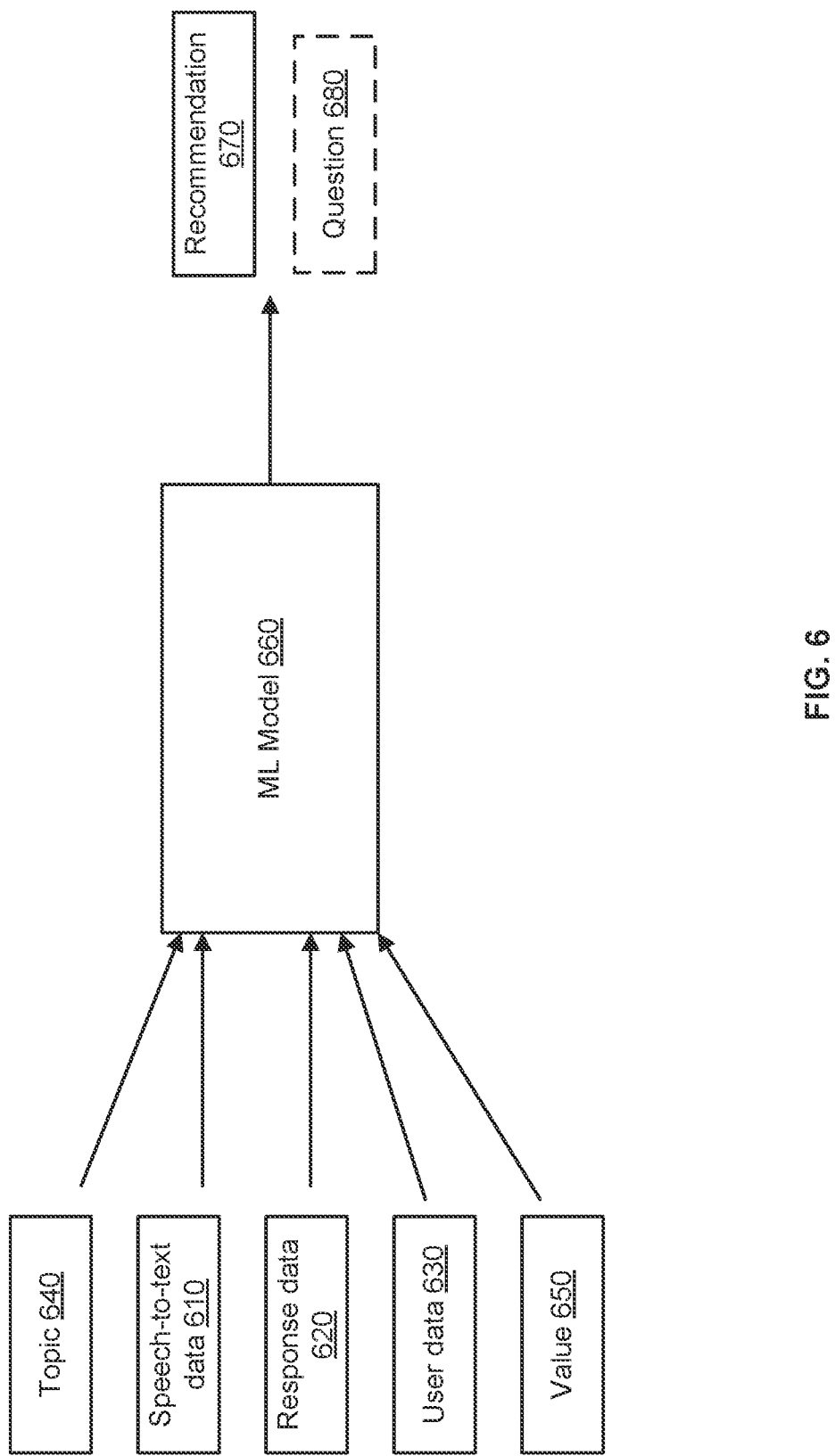
FIG. 6 illustrates an example of a ML model of a system determining a recommendation for content, according to embodiments of the present disclosure.

FIG. 6 illustrates an example of a ML model 660 of a system generating a recommendation 670 for content, according to embodiments of the present disclosure. The ML model 660 is an example of the ML model 460. The ML model 660 may be part of a computer system, such as the computer system 430. The ML model 660 can be implemented in hardware or as software code executing on hardware and is described herein next.

In an example, the ML model 660 receives speech-to-text data 610, response data 620, user data 630, a topic 640, and a value 650. The speech-to-text data 610 corresponds to speech input from a user at a device communicatively connected to the computer system. The response data 620 includes a response to the speech input. The topic 640 is a topic associated with the speech input from the user and the value 650 is associated with the response to the speech input. The user data 630 is associated with the user providing the speech input. For instance, the device is registered with a user account. The user data 630 may be available from the user account or from a data store associated with the user account. Generally, the user data 630 is relevant to the user and usable to determine a relevant recommendation. For example, the user data 630 includes any of a history of requests, a user preference, or content affinities.

In an example, the ML model 660 determines a recommendation 670. The recommendation 670 is for the device to initiate an action (e.g., music playback, turning lights on/off, etc.). The ML model 660 can be a machine-learning model, such as a multi-armed bandit model. The ML model 660 can be trained to generate and/or rank candidate recommendations. The ML model 660 determines the highest ranking candidate recommendation to be the recommendation 670 based on input related to the speech-to-text-data 610, response data 620, user data 630, topic 640, and the value 650. The ML model may alternatively identify multiple recommendations (e.g., the top four ranked recommendations (or some other number) or recommendations that have a score above a threshold). Each of the multiple recommendations can be identified in prompt data for the user to select. For example, the device can have a GUI, and the recommendations can be displayed. The user can select one or more of the recommendations via the GUI to initiate.

In an example, the ML model 660 also determines a question 680 of whether to initiate the action associated with the recommendation 670 at the user device. The ML model 660 that determines the question 680 may be the same ML model that determines the recommendation 670, or it can be a second ML model.

In an example, two ML models 660 can be initially trained offline using a reward function. A first ML model is trained for determining the recommendation 670 and a second ML model is trained for determining the question 680. Both of the ML models are implemented as multi-armed bandit models. For the first ML model, the reward function depends on how long or how the user interacted with the recommendation. For instance, for a music recommendation, the longer the user listened to the recommendation, the higher the reward is. For the second ML model, the reward depends on the response of the user to the question (did they ignore it, respond negatively, or respond positively). Positive response would have higher reward, then negative response, then ignore.

In another example, one ML model is trained for both the recommendation 670 and the question 680. The reward function for the ML model is a hybrid of the previously described reward function. How long or how the user interacted with the recommendation and the type of user response to the question can be equally weighed or have different weights in the reward function.

Figure 7:
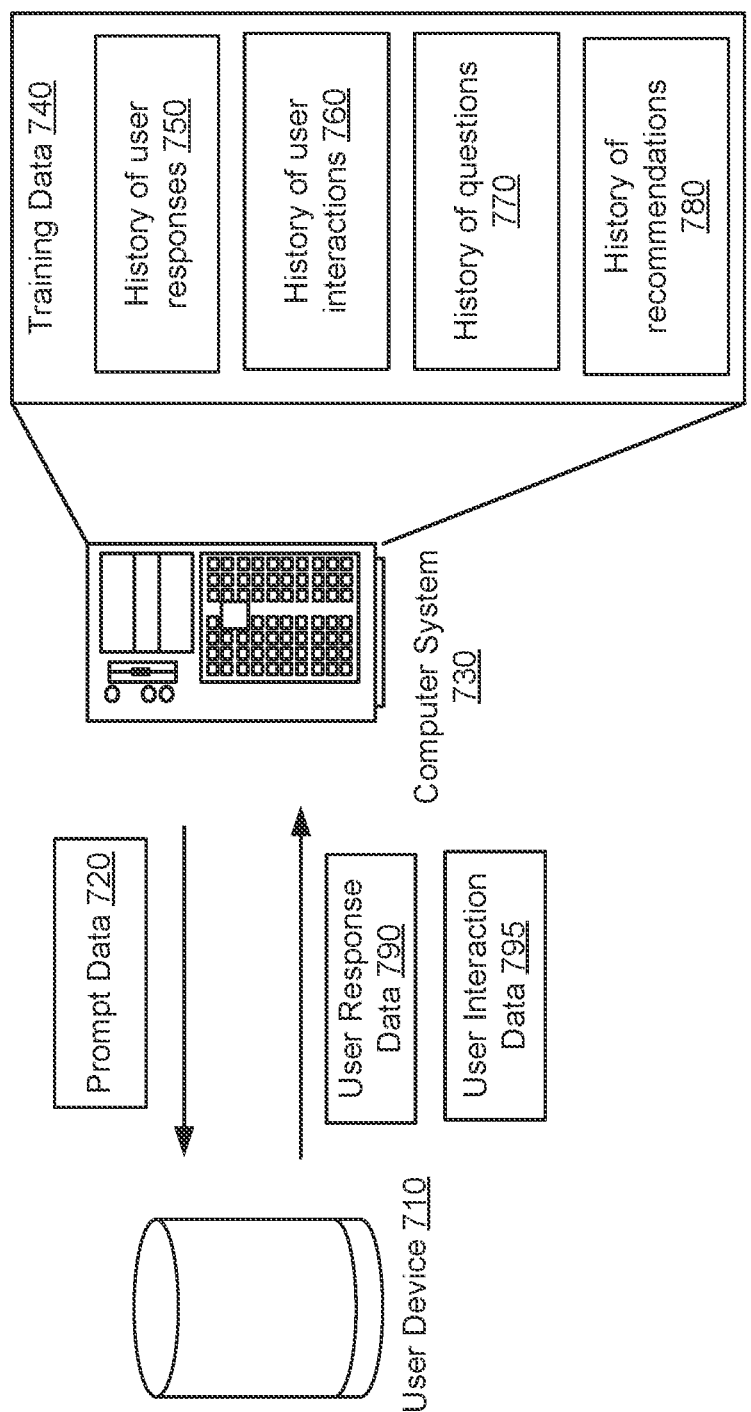
FIG. 7 illustrates an example of components of a system for training an ML model for determining a recommendation for content, according to embodiments of the present disclosure.

FIG. 7 illustrates an example of components of a system for training an ML model for generating a recommendation for content, according to embodiments of the present disclosure. The system includes a user device 710, which is an example of device 110 in FIG. 1. The system also includes a computer system 730, which is an example of the computer system 430 in FIG. 4.

In an example, prompt data 720 is sent from the computer system 730 to the user device 710. The prompt data 720 includes a recommendation for content and a question of whether to initiate an action associated with the recommendation. The computer system 730 receives user response data 790 and user interaction data 795 associated with a user's response to the recommendation. For example, the user response data 790 indicates a type of a response of a user to the question in the prompt data 720 (e.g., "yes," "no," or "ignored"). The user interaction data 795 indicates how the user interacted with the recommendation (e.g., a length of time the user interacts with the recommendation, such as how long the user did listened to recommended music; or a type of the interaction, such as whether the user turned on a smart device following the recommendation to turn off the smart device).

In an example, the computer system 730 stores the user response data 790 in training data 740 as a history of user responses 750. The computer system 730 also stores the user interaction data 795 in the training data 740 as a history of user interactions 760. Additionally, the training data 740 includes a history of questions 770 and a history of recommendations 780 that are associated with the user response data 790 (e.g., a historical question and a historical recommendation that were presented via prompt data to a user are associated with the corresponding user response and user interaction data that are in the training data 740). The training data 740 is used to further train one or more ML models to provide recommendations and questions the user will respond favorably to.

In an example, an ML model is trained based on the history of user responses 750 and the history of user interactions 760. The ML model is configured to output the question and the recommendation. The ML model is trained using a reward function, such that favorable responses and longer interactions with recommendations are associated with a higher reward. The ML model learns to output questions and recommendations based on an expected high reward.

In another example, a first ML model is trained based on the history of user responses 750 and the history of questions 770, and is configured to output the question associated with the recommendation. The first ML model is trained using a reward function. For example, for the question "would you like me to play soft music suitable for a rainy day?" and a response of "yes", the reward would be higher than a response of "no."

In this example, a second ML model is trained based on the history of user interactions 760 and the history of recommendations 780. The second ML model is configured to output the recommendation and learns which recommendation to output based on a reward function. For example, a recommendation of Artist ABC that the user interacts with for a predefined amount of time (e.g., thirty seconds) will have a higher reward than a recommendation that the user interacts with for less than the predefined amount of time.

The one or more ML models can be trained for all users of devices similar to the user device 710. In such examples, the training data 740 includes data for multiple users. Alternatively, the one or more ML models may be trained for each individual user of the user device 710. In such instances, the training data 740 includes the histories of the individual user.

In an example, there is a loop between the two ML models to remove bias in the training. In this example the first ML model (e.g., the ML model that outputs the question) is trained using the history of user interactions 760 and the history of user responses 750. The first ML model may become biased in a certain way (e.g., to give higher reward) for certain user interactions. For example, if a significant percentage of user interactions are positive (e.g., actions are initiated and performed for a duration longer than a threshold, such as music is streamed for more than one minute), then the first ML model can be biased to learn questions that were used for positive interactions, rather than to distinguish between positive and negative questions (e.g., ones that will trigger a positive response to initiate the actions and ones that will trigger a negative response or no response at all). This bias may not be desirable because the first ML model may not learn what the negative questions may be. It is desirable for the first ML model to unbiasedly determine the best question. Similarly, the second ML model (the one that outputs the recommendation) may become biased for recommendations that had a particular response type (e.g., positive or negative). It is desirable for the second ML model to unbiasedly determine positive recommendations and negative recommendations. Accordingly, the feedback loop allows the two ML models to exchange data such that the bias of each is removed. For instance, the first ML model can indicate to the second ML model which of the training user responses are ranked high (positive) and which ones are ranked low (negative). When the second ML model is being trained, the second ML model can balance the training by using a particular ratio of user interactions that have positive responses and user interactions that have negative responses. Similarly, the first ML model uses a particular ratio of user responses that have positive interactions and user responses that have negative interactions, where the type of interactions (e.g., positive or negative) is indicated by the second ML model.

In an example, the one or more ML models are continuously trained. After the one or more ML models are trained, an instance of the one or more ML models is added to a user account. From that point on, that instance of the one or more ML models is used for request data coming from a device associated with the user account. The user responses and/or interactions specific to the user account can be tracked and added to the continuous training of the instance. As a result, over time, this ML model instance becomes customized to the user account.

In another example, an ML model is trained and is used across a user based. User responses and/or interactions per user account are tracked (e.g., using a user identifier (ID) or an account ID). Upon receiving a new request from a user device, the user ID/account ID is determined and the expected user response and/or interaction is determined. If the response and/or interaction is expected to be negative (e.g., the user will likely ignore or not initiate the recommended action or may terminate the recommended action shortly after it is initiated), the recommendation and/or prompt data are suppressed and are not provided to the user device.

Figure 8:
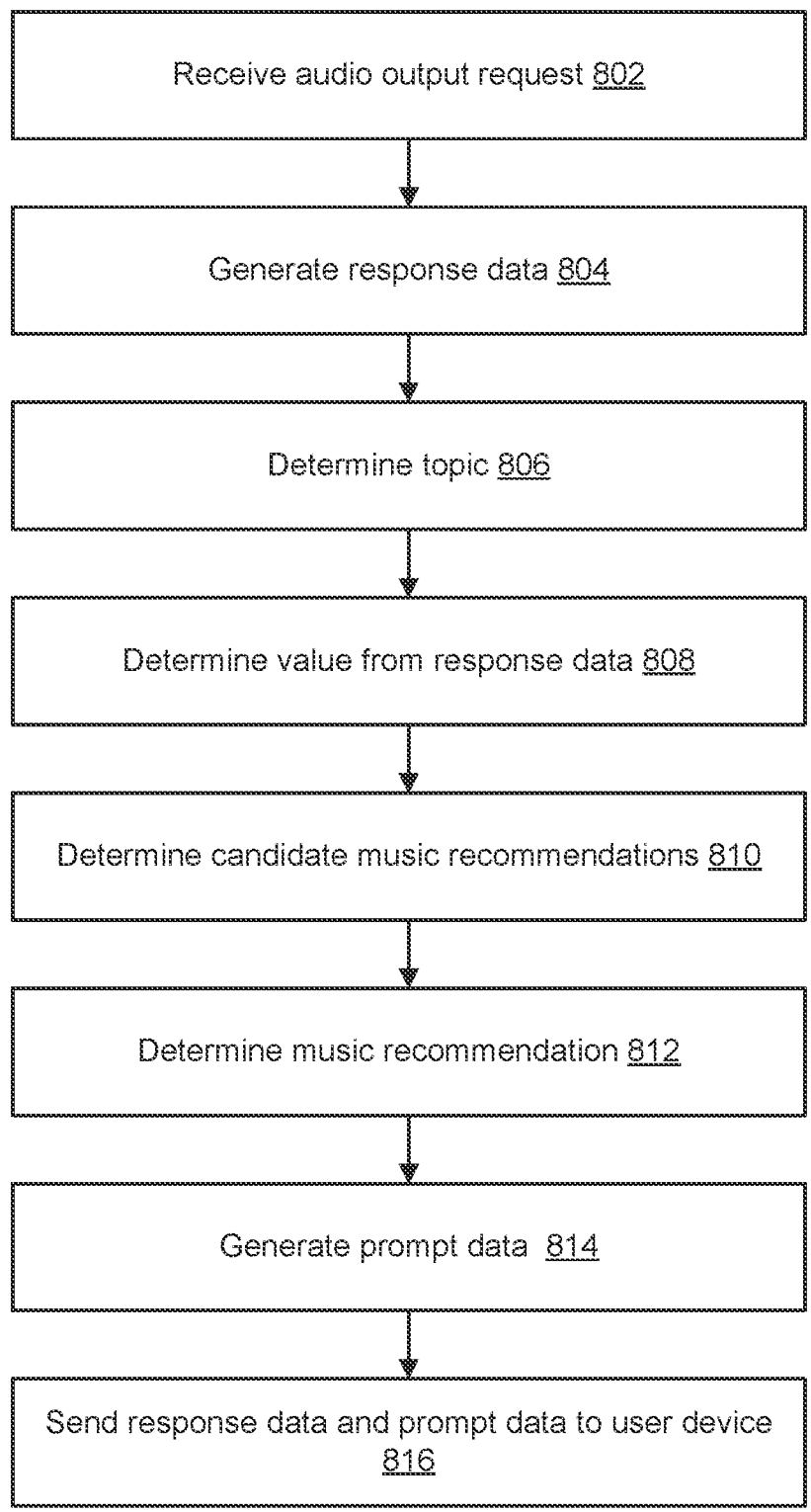
FIG. 8 illustrates an example of a flow for receiving speech input and sending prompt data, according to embodiments of the present disclosure.

FIG. 8 illustrates an example of a flow for receiving speech input and sending prompt data, according to embodiments of the present disclosure. Operations of the flow can be performed by a computer system, such as the computer system 430. Some or all of the instructions for performing the operations can be implemented as hardware circuitry and/or stored as computer-readable instructions on a non-transitory computer-readable medium of the sound detector. As implemented, the instructions represent modules that include circuitry or code executable by processor(s) of the computer system. The use of such instructions configures the computer system to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered. The operations may be performed using sub-operations of FIG. 9. In the flow of FIG. 8, the operations are described in connection with a music recommendation. However, the flow is not limited as such and apply to other types of recommendation depending on the specific speech input and resulting response.

In an example, the flow includes operation 802, where the computer system receives an audio output request. The computer system receives the request from a user device as speech-to-text data. The request corresponds to speech input by the user at the user device. As indicated above, other types of request can be received (e.g., for outputting a recipe, or for triggering an activity supported by the user device and/or the computer system).

In an example, the flow includes operation 804, where the computer system generates response data. The response data corresponds to a response to the audio output request. For example, the audio output request is for weather and the response data includes a response of "it's raining."

In an example, the flow includes operation 806, where the computer system determines a topic. A language model of the computer system, such as the language model 450 or the language model 530, determines the topic associated with the request based on the speech-to-text data and the response data. For example, the language model determines the topic is "weather" based on the speech-to-text data including the request for weather and the response data indicating "it's raining."

In an example, the flow includes operation 808, where the computer system determines a value from the response data. The language model may determine the value from the response data. The value may be taken directly from the response data (e.g., raining), or additional processing of the response data may be performed to determine the value.

In an example, the flow includes operation 810, where the computer system determines candidate music recommendations. The language model or a separate recommendation engine of the computer system determines the candidate music recommendations. The candidate recommendations are determined based on the topic and the value. For example, a topic of "weather" and a value of "raining" may include candidate music recommendations for soft music and similar genres.

In an example, the flow includes operation 812, where the computer system determines a music recommendation. An ML model of the computer system can determine the music recommendation. The music recommendation is determined from among the candidate music recommendations based on the speech-to-text data, the response, and a user account associated with the user device. The user account can include user content affinities or other preferences that the ML model can use to determine the music recommendation.

In an example, the flow includes operation 814, where the computer system generates prompt data. The prompt data includes a question of whether to playback the music recommendation at the user device. The same or a different ML model determines the question associated with the recommendation.

In an example, the flow includes operation 816, where the computer system sends the response data and the prompt data to the user device. The user device outputs the response data prior to outputting the prompt data. For example, in response to speech input "Alexa, what's the weather like?" the user device can output "It's raining. Would you like me to play soft music suitable for a rainy day?", where "It's raining" corresponds to the response data and "would you like me to play soft music suitable for a rainy day?" corresponds to the prompt data. As indicated above, the response data and/or the prompt data may be additionally or alternatively sent to one or more other user devices. This may be the case when, for example, multiple user devices are associated with a same user account and/or with one or more individual accounts that are part of a group account.

Figure 9:
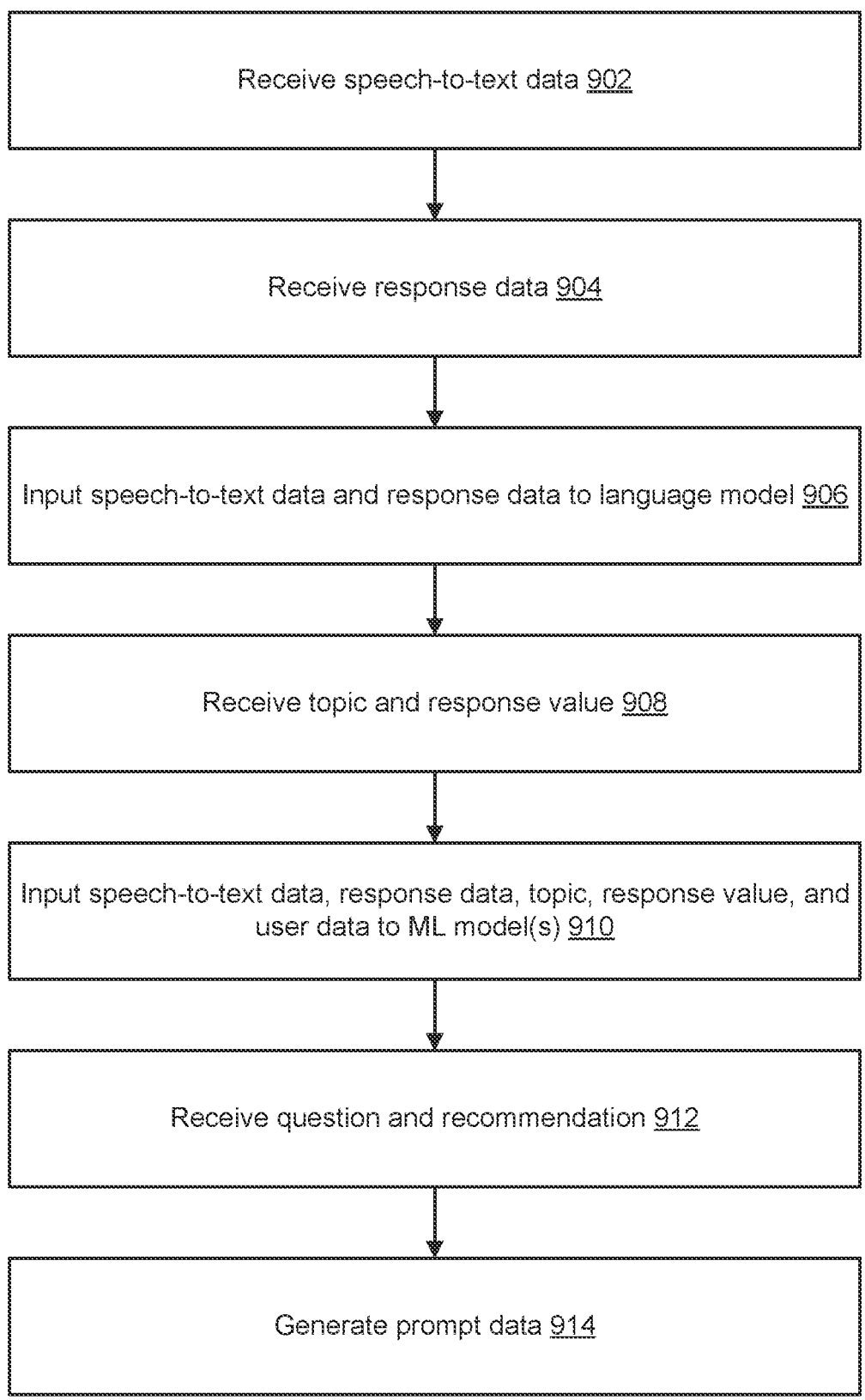
FIG. 9 illustrates another example of a flow for receiving speech input and sending a response and prompt data, according to embodiments of the present disclosure.

FIG. 9 illustrates another example of a flow for receiving speech input and sending a response and prompt data, according to embodiments of the present disclosure. Operations of the flow can be performed by a computer system, such as the computer system 430. Some or all of the instructions for performing the operations can be implemented as hardware circuitry and/or stored as computer-readable instructions on a non-transitory computer-readable medium of the sound detector. As implemented, the instructions represent modules that include circuitry or code executable by processor(s) of the computer system. The use of such instructions configures the computer system to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered. In the flow of FIG. 9, the operations are described in connection with a music recommendation. However, the flow is not limited as such and apply to other types of recommendation depending on the specific speech input and resulting request.

In an example, the flow includes operation 902, where the computer system receives speech-to-text data. The speech-to-text data includes a request and corresponds to speech input by the user at the user device. For example, the speech-to-text data can correspond to speech input of "Alexa, what's the weather like?" as audio In this example, the speech-to-text data includes "what's the weather like" as text.

In an example, the flow includes operation 904, where the computer system receives response data. The response data corresponds to a response to the speech input. For example, the audio output request is for weather and the response data includes a response of "it's raining."

In an example, the flow includes operation 906, where the computer system inputs the speech-to-text data and the response data to a language model. The language model may be hard-coded configured to or and ML model trained to determine a topic (e.g., weather, music) and a value (e.g., raining, sunny, Artist ABC) associated with the speech-to-text data and the response data.

In an example, the flow includes operation 908, where the computer system receives the topic and the response value. The computer system receives the topic and response value from the language model. The computer system uses the topic and response value to determine candidate music recommendations. The candidate music recommendations can be determined by the language model, a recommendation engine, or another ML model(s).

In an example, the flow includes operation 910, where the computer system inputs the speech-to-text data, the response data, the topic, the response data, and user data to ML model(s). The ML model(s) can be trained to determine a question and recommendation based on the inputs.

In an example, the flow includes operation 912, where the computer system receives the question and the recommendation. The computer system receives the question and the recommendation from the ML model(s). For example, the question is "would you like me to play . . . " and the recommendation is "soft music suitable for a rainy day."

In an example, the flow includes operation 914, where the computer system generates prompt data. The prompt data includes the question for the recommendation. The computer system sends the prompt data along with the response data to the user device to be output by the user device.

Figure 10:
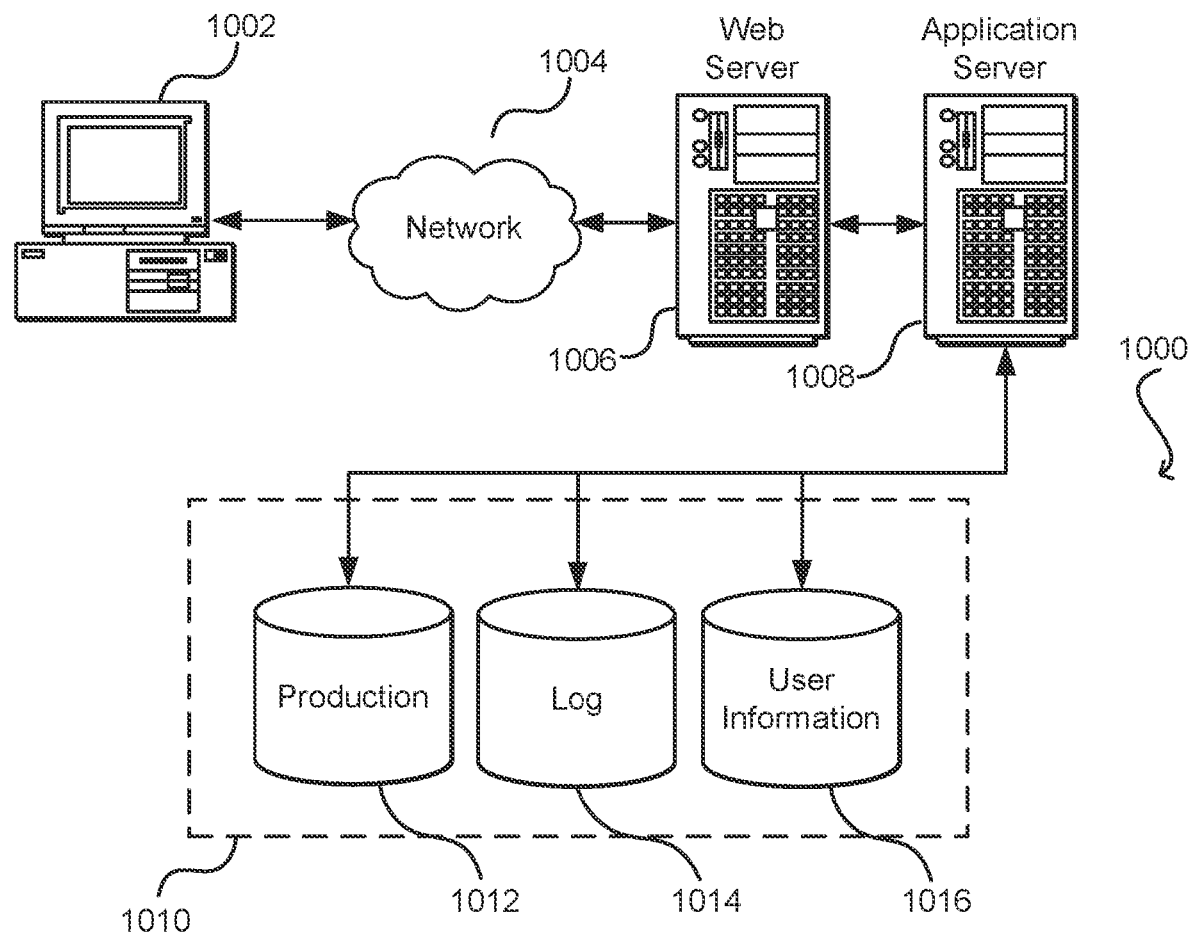
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002 (such as any of the multimedia devices described herein above), which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. One or more non-transitory computer-readable storage media storing instructions that, upon execution on a system, cause the system to perform operations comprising:
   determining, based at least in part on a request for an output and a response about the output, a topic associated with the request and the response;
   determining the response based at least in part on the request;
   determining a recommendation based at least in part on the request and a user account associated with one or more user devices, the recommendation determined subsequent to the response and associated with an action that can be initiated at the one or more user devices;
   generating prompt data that indicates a question of whether to initiate the action associated with the recommendation; and
   sending response data about the response and the prompt data to the one or more user devices, the response data output by the one or more user devices prior to outputting the prompt data.

2. The one or more non-transitory computer-readable storage media of claim 1 storing further instructions that, upon execution on the system, cause the system to perform additional operations comprising:
   receiving, from a user device, the request, wherein the request is for an audio output that is unrelated to music playback, the request comprising speech-to-text data generated based at least in part on speech input at the user device;
   generating, based at least in part on the speech-to-text data, the response data for the response, the response data comprising the audio output, the speech input and the response data associated with a dialogue event processed by the system;
   inputting, to a language model of the system, the speech-to-text data and the response data, wherein the language model is configured to output the topic and a value associated with the topic;
   inputting, to a first machine learning (ML) model and a second ML model of the system, the topic, the value of the speech-to-text data, the response data, and user data from the user account, wherein the first ML model is configured to output an identifier of the recommendation, wherein the recommendation comprises a music recommendation, and wherein the second ML model is configured to output the question; and adding the question and the identifier to the prompt data.

3. The one or more non-transitory computer-readable storage media of claim 2, wherein the first ML model is trained based at least in part on first historical data about time lengths of user interactions with recommended audio content, and wherein the second ML model is trained based at least in part on second historical data about user responses to questions of whether the recommended audio content are to be presented.

4. The one or more non-transitory computer-readable storage media of claim 2, wherein the first ML model is trained based at least in part on a reward function that comprises a first variable and a second variable, the first variable corresponding to time lengths of user interactions with recommended audio content, and the second variable corresponding to user responses to questions of whether the recommended audio content are to be presented.

5. A computer-implemented method, comprising:
   determining, based at least in part on a request for an output and a response about the output, a topic associated with the request and the response;
   determining the response based at least in part on the request;
   determining a recommendation based at least in part on the request and a user account associated with one or more user devices, the recommendation determined subsequent to the response and associated with an action that can be initiated at the one or more user devices;
   generating prompt data that indicates a question of whether to initiate the action associated with the recommendation; and
   sending response data about the response and the prompt data to the one or more user devices, the response data output by the one or more user devices prior to outputting the prompt data.

6. The computer-implemented method of claim 5, further comprising:
   receiving, from a user device, the request for the output;
   generating, based at least in part on the request, the response about the output;
   determining, based at least in part on the response, a value associated with the response; and
   determining, based at least in part on the topic and the value, a plurality of candidate recommendations, a candidate recommendation comprising a corresponding action that can be initiated at the one or more user devices, wherein the recommendation is determined from the plurality of candidate recommendations.

7. The computer-implemented method of claim 6, further comprising:
   determining a mapping of topic-value to music recommendations, wherein the plurality of candidate recommendations are determined based at least in part on a look up of the mapping, wherein the look up comprises the topic and the value.

8. The computer-implemented method of claim 5, further comprising:
   inputting speech-to-text data and the response to a language model, wherein the speech-to-text data corresponds to the request; and
   receiving, from the language model, data indicating the topic.

9. The computer-implemented method of claim 5, further comprising:
   receiving first data from the one or more user devices, the first data indicating a user response to the question;
   storing the user response in a training data set;
   receiving second data from the one or more user devices, the second data indicating a length of time of the action being performed according to the user response; and
   storing the length of time in the training data set.

10. The computer-implemented method of claim 9, further comprising:
    training a first machine learning (ML) model based at least in part on the user response from the training data set, the first ML model configured to output the question.

11. The computer-implemented method of claim 10, further comprising:
    training a second ML model based at least in part on the length of time from the training data set, the second ML model configured to output the recommendation.

12. The computer-implemented method of claim 9, further comprising:
    training a machine learning (ML) model based at least in part on the user response and the length of time from the training data set, the ML model configured to output the question and the recommendation.

13. A system comprising:
    one or more processors;
    one or more memories storing computer-readable instructions that, upon execution by the one or more processors, configure the system to:
      determine, based at least in part on a request for an output and a response about the output, a topic associated with the request and the response;
      determine the response based at least in part on the request;
      determine a recommendation based at least in part on the request and a user account associated with one or more user devices, the recommendation determined subsequent to the response and associated with an action that can be initiated at the one or more user devices;
      generate prompt data that indicates a question of whether to initiate the action associated with the recommendation; and
      send response data about the response and the prompt data to the one or more user devices, the response data output by the one or more user devices prior to outputting the prompt data.

14. The system of claim 13, wherein the one or more memories store further computer-readable instructions that, upon execution by the one or more processors, additionally configure the system to:
    input first data from the request and second data from the response to a language model of the system, wherein the language model is configured to output the topic.

15. The system of claim 14, wherein the one or more memories store additional computer-readable instructions that, upon execution by the one or more processors, further configure the system to:
    input the first data from the request, the second data from the response, and third data from the user account to a machine learning (ML) model of the system, wherein the ML model is configured to output at least the recommendation.

16. The system of claim 15, wherein the ML model is further configured to output at least the question based at least in part on the first data, the second data, and the third data.

17. The system of claim 15, wherein the ML model is trained based at least in part on historical user responses to historical questions about recommendations and on lengths of time of historical user interactions with the recommendation.

18. The system of claim 13, wherein the request is for an audio output that is unrelated to music playback, wherein the recommendation comprises a music recommendation, and wherein the question is whether to playback the music recommendation at the one or more user devices.

19. The system of claim 13, wherein the request is for music playback, wherein the recommendation indicates an unrelated action to the music playback.

20. The system of claim 13, wherein the request is for an audio output that is unrelated to music playback, and wherein the recommendation indicates an unrelated action to the music playback.

* * * * *